US012741275B2

(12) United States Patent
Nakazawa et al.

(10) Patent No.: US 12,741,275 B2
(45) Date of Patent: Sep. 22, 2026

(54) CHA-TYPE ZEOLITE AND METHOD FOR PRODUCING THE SAME

(71) Applicant: TOSOH CORPORATION, Yamaguchi (JP)

(72) Inventors: Naoto Nakazawa, Yamaguchi (JP); Toyohiro Usui, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 610 days.

(21) Appl. No.: 18/022,865

(22) PCT Filed: Aug. 24, 2021

(86) PCT No.: PCT/JP2021/031056

§ 371 (c)(1),
(2) Date: Feb. 23, 2023

(87) PCT Pub. No.: WO2022/045158

PCT Pub. Date: Mar. 3, 2022

(65) Prior Publication Data

US 2023/0211327 A1 Jul. 6, 2023

(30) Foreign Application Priority Data

Aug. 28, 2020 (JP) ................................ 2020-144834

(51) Int. Cl.

| | |
|---|---|
| ***B01J 29/70*** | (2006.01) |
| ***B01J 29/08*** | (2006.01) |
| ***B01J 35/40*** | (2024.01) |
| ***B01J 35/61*** | (2024.01) |
| ***B01J 35/63*** | (2024.01) |
| ***B01J 35/70*** | (2024.01) |
| ***B01J 35/77*** | (2024.01) |
| ***B01J 37/04*** | (2006.01) |
| *B01J 35/80* | (2024.01) |

(52) U.S. Cl.

CPC ........... *B01J 29/7015* (2013.01); *B01J 29/08* (2013.01); *B01J 35/40* (2024.01); *B01J 35/615* (2024.01); *B01J 35/617* (2024.01); *B01J 35/633* (2024.01); *B01J 35/70* (2024.01); *B01J 35/77* (2024.01); *B01J 37/04* (2013.01); *B01J 35/80* (2024.01); *B01J 2235/15* (2024.01); *B01J 2235/30* (2024.01)

(58) Field of Classification Search

None

See application file for complete search history.

(56) References Cited

U.S. PATENT DOCUMENTS

| | | | |
|---|---|---|---|
| 2016/0137517 A1* | 5/2016 | Nicolas ................... | C01B 39/22 423/709 |
| 2018/0250663 A1 | 9/2018 | Hotta et al. | |

FOREIGN PATENT DOCUMENTS

| | | |
|---|---|---|
| JP | 2012-116747 A | 6/2012 |
| JP | 2015-66532 A | 4/2015 |
| JP | 2017-48106 A | 3/2017 |
| WO | 2013/182974 A1 | 12/2013 |
| WO | 2017/038851 A1 | 9/2017 |

OTHER PUBLICATIONS

Di lorio et al. "Controlling the Isolation and Pairing of Aluminum in Chabazite Zeolites Using Mixtures of Organic and Inorganic Structure-Directing Agents" Chemistry of Materials. The American Chemical Society. Chem. Mater. 28. 2236-2247 (2016). (Year: 2016).*

Dusselier et al. Small Pore Zeolites: Synthesis and Catalysis. Chem. Rev. 118, 5265-5329. (2018). (Year: 2018).*

Renzo et al. "Zeolites as tailor made catalysts: Control of the crystal size". Catalysis Today. 41. 37-40 (1998). (Year: 1998).*

Palcic et al. "Nanosized Cu-SSZ-13 and Its Application in NH3-SCR". Catalysts. 10, 506 (2020). (Year: 2020).*

High-quality synthesis of a nanosized CHA zeolite by a combination of a starting FAU zeolite and aluminum sources, Takuya et al., Dalton Trans., 2020, 49, 9972-9982.

Nishitoba et al., "Control of Al Distribution in the CHA-Type Aluminosilicate Zeolites and Its Impact on the Hydrothermal Stability and Catalytic Properties", Ind. Eng. Chem., 57 Res., Feb. 27, 2018, pp. 3914-3922.

Iorio et al., "Controlling the Isolation and Pairing of Aluminum in Chabazite Zeolites Using Mixtures of Organic and Inorganic Structure-Directing Agents", Chem. Mater., 28, Mar. 3, 2016, pp. 2236-2247.

Devos et al., "Synthesis-Structure-Activity Relations in Fe-CHA for C—H Activation: Control of Al Distribution by Interzeolite Conversion", Chem. Mater., 32, Nov. 27, 2019, pp. 273-285.

Paolucci et al., "Catalysis in a Cage: Condition-Dependent Speciation and Dynamics of Exchanged Cu Cations in SSZ-13 Zeolites", J. Am. Chem. Soc., 138, Apr. 12, 2016, pp. 6028-6048.

Iorio et al., "Introducing Catalytic Diversity into Single-Site Chabazite Zeolites of Fixed Composition via Synthetic Control of Active Site Proximity", Journal of American Chemical Society , Aug. 17, 2017, pp. 6663-6674.

(Continued)

*Primary Examiner* — Sheng H Davis

(74) *Attorney, Agent, or Firm* — GREENBLUM & BERNSTEIN, P.L.C.

(57) ABSTRACT

Provided is at least one of a CHA-type zeolite having a greater amount of a paired aluminum structure than do CHA-type zeolites of the related art; a catalyst containing the CHA-type zeolite; and a method for producing these. A method for producing a CHA-type zeolite includes crystallizing a composition that contains an alumina source, a silica-alumina source, an alkali source, an organic structure-directing agent and water. Preferably, the composition is prepared by mixing the alumina source, the alkali source, the organic structure-directing agent and the water together and subsequently mixing the silica-alumina source therewith.

11 Claims, 1 Drawing Sheet

(56) References Cited

OTHER PUBLICATIONS

International Search Report issued Oct. 19, 2021 in International Bureau of WIPO Patent Application No. PCT/JP2021/031056, along with an English translation thereof.

International Preliminary Report on Patentability issued Feb. 28, 2023 in International Bureau of WIPO Patent Application No. PCT/JP2021/031056, along with an English translation thereof.

J. Zhang et al., "Importance of controllable Al sites in CHA framework by crystallization pathways for NH3-SCR reaction", Applied Catalysis B: Environmental 277 (2020) 119193.

Supplementary European Search Report dated Oct. 16, 2024 in European family member application No. 21861582.1.

* cited by examiner

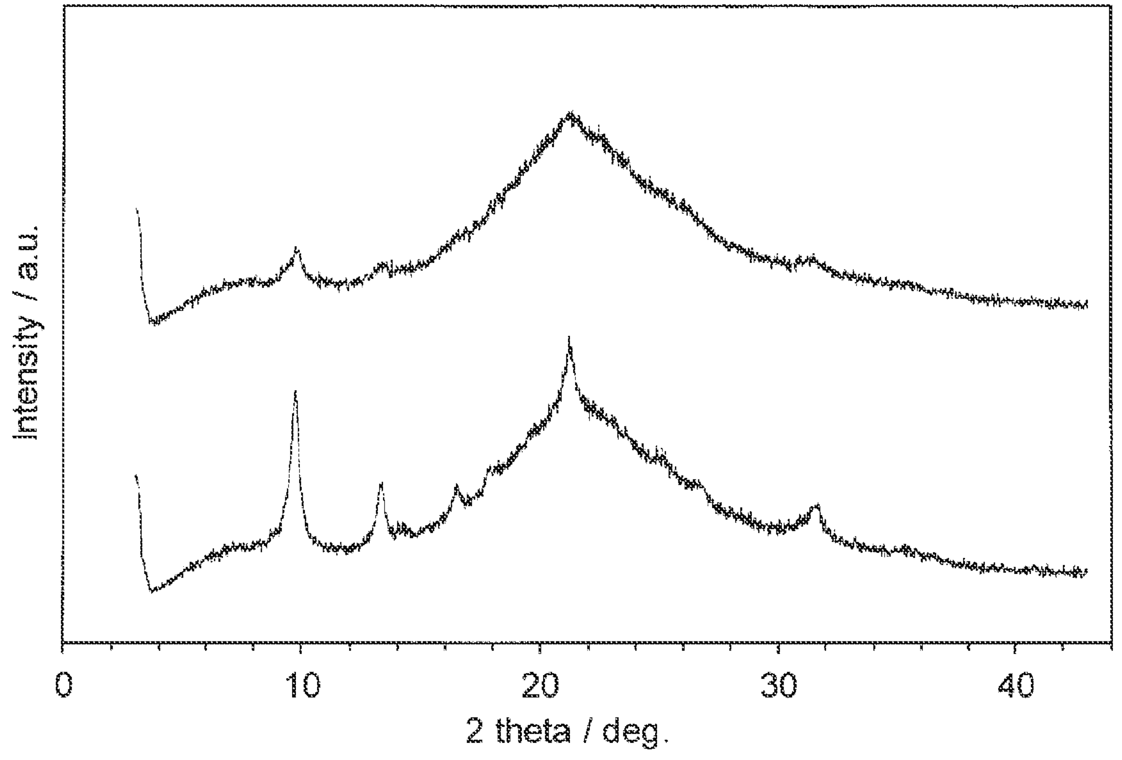
Intensity / a.u.
0
10
20
30
40
2 theta / deg.

CHA-TYPE ZEOLITE AND METHOD FOR PRODUCING THE SAME

TECHNICAL FIELD

The present disclosure relates to a CHA-type zeolite and a method for producing the same. In particular, the present disclosure relates to a CHA-type zeolite suitable as a nitrogen oxide reduction catalyst and for industrial use, and the present disclosure also relates to a method for producing the CHA-type zeolite.

BACKGROUND ART

CHA-type zeolites (chabazite-type zeolites), which have a high $SiO_2/Al_2O_3$ ratio, are artificially synthesized small-pore zeolites (e.g., Patent Literature 1 and 2, Non Patent Literature 1 and the like). In recent years, studies focused on the distribution of aluminum in the framework structure of CHA-type zeolites, in particular, on a "paired aluminum structure", have been reported.

Regarding the reports on the paired aluminum structure, Non Patent Literature 2 reports that a CHA-type zeolite prepared by crystallizing a composition containing, as starting materials, adamantyltrimethylammonium hydroxide and crystalline aluminum hydroxide ($Al(OH)_3$) has a proportion of paired aluminum to the total aluminum present therein of 5% or greater and 17% or less. Non Patent Literature 3 reports that a CHA-type zeolite having a cation type that is a sodium type, which is prepared by crystallizing a composition containing adamantyltrimethylammonium hydroxide, has a proportion of paired aluminum to the total aluminum present therein of 60% or less.

Some CHA-type zeolites contain copper (supported thereon) and are used as nitrogen oxide reduction catalysts, in particular, as SCR catalysts. The ion exchange sites on a double 6-membered oxygen ring structure having a paired aluminum structure can easily hold copper in a stable manner, and, therefore, according to a report, by introducing the copper into the ion exchange sites, nitrogen oxide reduction properties can be improved (Non Patent Literature 4).

CITATION LIST

Patent Literature

PTL 1: Japanese Unexamined Patent Application Publication No. 2012-116747

PTL 2: International Publication No. 2013/182974

Non Patent Literature

NPL 1: Ind. Eng. Chem. Res., 57 (2018) 3914-3922

NPL 2: Chem. Mater., 28 (2016) 2236-2247

NPL 3: Chem. Mater., 32 (2020) 273-285

NPL 4: J. Am. Chem. Soc., 138 (2016) 6028-6048

SUMMARY OF INVENTION

Technical Problem

An object of the present disclosure is to provide at least one of a CHA-type zeolite having a greater amount of a paired aluminum structure than do CHA-type zeolites of the related art; a catalyst containing the CHA-type zeolite; and a method for producing these.

Solution to Problem

The present invention is in accordance with the invention set forth in the claims, and a summary of the present disclosure is as follows.

[1] A CHA-type zeolite characterized by having a paired aluminum ratio of 25% or greater.

[2] The CHA-type zeolite according to [1], wherein the CHA-type zeolite has a molar ratio of silica to alumina of 10 or greater.

[3] The CHA-type zeolite according to [1] or [2], wherein the CHA-type zeolite has a molar ratio of silica to alumina of 70 or less.

[4] The CHA-type zeolite according to any one of [1] to [3], wherein the CHA-type zeolite has a micropore volume of 0.2 mL/g or greater.

[5] The CHA-type zeolite according to any one of claims 1 to 4, characterized in that the CHA-type zeolite has an average crystal size of 0.7 μm or less.

[6] The CHA-type zeolite according to any one of [1] to [5], wherein the CHA-type zeolite has a BET specific surface area of 200 $m^2/g$ or greater and 1000 $m^2/g$ or less.

[7] A method for producing a CHA-type zeolite comprising a step of crystallizing a composition that contains an alumina source, a silica-alumina source, an alkali source, an organic structure-directing agent source and water.

[8] The method for producing a CHA-type zeolite according to [7], wherein the composition is prepared by mixing the alumina source, the alkali source, the organic structure-directing agent source and the water together and subsequently mixing the silica-alumina source therewith.

[9] The production method according to [7] or [8], wherein the alumina source is an amorphous aluminum compound.

[10] The production method according to any one of [7] to [9], wherein the silica-alumina source is a FAU-type zeolite.

[11] The production method according to any one of [7] to [10], wherein the composition contains a silica source.

[12] A nitrogen oxide reduction catalyst characterized by comprising the CHA-type zeolite according to any one of claims 1 to 6.

[13] A method for reducing a nitrogen oxide characterized by comprising using the CHA-type zeolite according to any one of claims 1 to 6.

ADVANTAGEOUS EFFECTS OF INVENTION

The present disclosure can provide at least one of a CHA-type zeolite having a greater amount of a paired aluminum structure than do CHA-type zeolites of the related art; a catalyst containing the CHA-type zeolite; and a method for producing these.

BRIEF DESCRIPTION OF DRAWINGS

FIG. 1 XRD patterns of copper-supported CHA-type zeolites of (a) Comparative Example 1 and (b) Example 1 that have undergone a hydrothermal durability treatment.

DESCRIPTION OF EMBODIMENTS

The present disclosure will be described below with reference to examples of an embodiment thereof. Some of the terms used in the present embodiment are as follows.

An “aluminosilicate” is a composite oxide having a structure formed of repeating networks containing aluminum (Al) and silicon (Si) with interposed oxygen (O). Aluminosilicates include crystalline aluminosilicates and amorphous aluminosilicates. Crystalline aluminosilicates are those having a crystalline XRD peak, and amorphous aluminosilicates are those having no crystalline XRD peak, in a powder X-ray diffraction (hereinafter also referred to as “XRD”) pattern of the aluminosilicates.

In the present embodiment, the XRD pattern is measured by using CuKα radiation as a radiation source, and the measurement conditions include the following conditions.

Radiation source: CuKα radiation (λ=1.5406 Å)
Measurement mode: step scanning
Scan speed: 4.0° per minute
Measurement range: 2θ=3.0° to 50.0°

More preferred conditions include the following conditions.

Acceleration current and voltage: 40 mA and 40 kV
Radiation source: CuKα radiation (λ=1.5405 Å)
Measurement mode: continuous scanning
Scanning condition: 40°/minute
Measurement range: 28=3° to 430
Vertical divergence limiting slit: 10 mm
Divergence/entrance slit: 1°
Receiving slit: open
Detector: D/teX Ultra
Ni filter used The XRD pattern can be measured with a typical powder X-ray diffractometer (e.g., D8 Advance, manufactured by Bruker). The crystalline XRD peak is a peak that is detected by analyzing an XRD pattern with typical analysis software (e.g., SmartLab Studio II, manufactured by Rigaku Corporation) and determining the 28 of a peak top. The crystalline XRD peak is, for example, an XRD peak having a full width at half maximum of 28=0.50° or less.

A “zeolite” is a compound having a regular structure in which framework atoms (hereinafter also referred to as “T atoms”) are disposed with interposed oxygen (O), and the T atoms are at least one of the following: metal atoms and/or metalloid atoms. Examples of the metalloid atoms include atoms of at least one selected from the group of boron (B), silicon (Si), germanium (Ge), arsenic (As), antimony (Sb) and tellurium (Te).

A “zeolite-like material” is a compound having a regular structure in which T atoms are disposed with interposed oxygen, and the T atoms include atoms other than at least metal atoms or metalloid atoms. Examples of the zeolite-like material include composite phosphorus compounds in which the T atoms include phosphorus (P), such as aluminophosphate (AlPO) and silicoaluminophosphate (SAPO).

The “regular structure” (hereinafter also referred to as a “zeolite structure”) of the zeolite and the zeolite-like material is a framework structure determined according to the structure code specified by the Structure Commission of the International Zeolite Association (hereinafter also referred to simply as a “structure code”). For example, a CHA structure is a framework structure (CHA structure) identified as “CHA”, which is a structure code. The zeolite structure can be identified by making a comparison against XRD patterns of the structures shown in Collection of Simulated XRD Powder Patterns for Zeolites, Fifth Revised Edition, p. 483 (2007) (hereinafter also referred to as “reference patterns”). Regarding the zeolite structure, the “framework structure”, “crystal structure” and “crystalline phase” have the same meaning, as used herein.

In the present embodiment, the expression “ . . . -type zeolite” (e.g., “CHA-type zeolite”) means a zeolite having the zeolite structure represented by the structure code and preferably means a crystalline aluminosilicate having the zeolite structure represented by the structure code.

A method of the present disclosure for producing a CHA-type zeolite will be described below with reference to an example of an embodiment.

A CHA-type zeolite of the present embodiment can be prepared with a production method comprising a step of crystallizing a composition that contains an alumina source, a silica-alumina source, an organic structure-directing agent source, an alkali source and water. The step (hereinafter also referred to as a “crystallization step”) of crystallizing the composition (hereinafter also referred to as a “source material composition”) that contains an alumina source, a silica-alumina source, an organic structure-directing agent source, an alkali source and water crystallizes the CHA-type zeolite of the present embodiment.

The alumina source is alumina ($Al_2O_3$) or an aluminum (Al)-containing compound that serves as a precursor thereof. In particular, the compound is a compound containing aluminum and not containing silicon (Si). Specifically, the alumina source may be at least one selected from the group of aluminum hydroxide, aluminum chloride, aluminum sulfate, aluminum nitrate and sodium aluminate. In the present embodiment, preferably, the alumina source is an amorphous aluminum compound, that is, an amorphous compound containing aluminum, which, for example, may be at least one of a dried aluminum hydroxide gel and sodium aluminate or may be a dried aluminum hydroxide gel. Preferably, the alumina source contains at least an amorphous aluminum compound, and more preferably, the alumina source is an amorphous aluminum compound.

The silica-alumina source is a compound containing silicon and aluminum. Specifically, the silica-alumina source may be at least one of aluminosilicate, amorphous aluminosilicate and crystalline aluminosilicate or may be crystalline aluminosilicate. The silica-alumina source may have a molar ratio of silica to alumina (hereinafter also referred to as a “$SiO_2/Al_2O_3$ ratio”) of 1.25 or greater or 5 or greater and 100 or less, 50 or less, 10 or less or 9.5 or less. The silica-alumina source may have a cation type that may be at least one selected from the group of a sodium type (Na type), a proton type ($H^+$ type) and an ammonium type ($NH_4$ type) or may be a sodium type. It is preferable that the silica-alumina source have a BET specific surface area of 200 $m^2/g$ or greater or 500 $m^2/g$ or greater and 1000 $m^2/g$ or less or 800 $m^2/g$ or less.

Particularly preferably, the silica-alumina source may be crystalline aluminosilicate, may be at least one of a FAU-type zeolite, a zeolite X and a zeolite Y or may be a zeolite Y. Note that the silica-alumina source may be free of any crystalline aluminosilicate (i.e., seed crystal) for promoting the crystallization of the source material composition, and the source material composition may contain a seed crystal and the silica-alumina source. The silica-alumina source may be, for example, crystalline aluminosilicate other than CHA-type zeolites. It can be assumed that in the production method of the present embodiment, crystallizing the source material composition, which contains an alumina source and a silica-alumina source, that is, two or more aluminum compounds, enables the production of a CHA-type zeolite having a high paired Al ratio; preferably, the two or more aluminum compounds include a crystalline aluminum compound and an amorphous aluminum compound.

While the source material composition need not contain any silica source, the source material composition may, if necessary, contain a silica source so that the $SiO_2/Al_2O_3$ ratio can be fine-tuned. The silica source is silica ($SiO_2$) or a silicon compound that serves as a precursor thereof. In particular, the compound is a compound containing silicon and not containing aluminum. Specifically, the silica source may be at least one selected from the group of colloidal silica, amorphous silica, sodium silicate, tetraethoxysilane, tetraethyl orthosilicate, precipitated silica and fumed silica, at least one selected from the group of colloidal silica, amorphous silica, sodium silicate, precipitated silica and fumed silica or at least one of precipitated silica and fumed silica or may be fumed silica.

The organic structure-directing agent (hereinafter also referred to as an "SDA") source is at least one of a salt and a compound that each contain a cation that directs the formation of a CHA structure, that is, the organic structure-directing agent source is at least one selected from the group of a sulfuric acid salt of an SDA, a nitric acid salt of an SDA, a halide of an SDA and a hydroxide of an SDA or at least one of a halide of an SDA or a hydroxide of an SDA or is a hydroxide of an SDA.

The SDA is a cation that directs the formation of a CHA-type zeolite. Such an SDA is sufficient. The cation that directs the formation of a CHA-type zeolite may be, for example, at least one selected from the group of a N,N,N-trialkyl-adamantaneammonium cation, a N,N,N-trimethyl-benzylammonium cation, a N-alkyl-3-quinuclidinol cation, a N,N,N-trialkyl-exoaminonorbornane cation and a N,N,N-trialkyl-cyclohexylammonium cation. Preferably, the cation is at least one selected from the group of a N,N,N-trialkyl-adamantaneammonium cation (hereinafter also referred to as "$TAAd^+$"), a N,N,N-trimethyl-benzylammonium cation (hereinafter also referred to as "$TMBA^+$") and a N,N,N-trialkyl-cyclohexylammonium cation (hereinafter also referred to as "$TACH^+$"). More preferably, the cation is at least one of $TAAd^+$ and $TACH^+$. Particularly preferably, the cation is $TAAd^+$ and $TACH^+$.

A preferred $TAAd^+$may be a N,N,N-trimethyl-adamantaneammonium cation (hereinafter "$TMAda^+$"). Furthermore, a preferred $TACH^+$may be at least one of a N,N,N-dimethylethyl-cyclohexylammonium cation (hereinafter also referred to as "$CDMEA^+$") and a N,N,N-methyldiethyl-cyclohexylammonium cation (hereinafter also referred to as "$MDECH^+$") or may be $CDMEA^+$.

The alkali source is a compound containing an alkali metal element and may be a compound containing at least one selected from the group of sodium, potassium, rubidium and cesium, a compound containing at least one selected from the group of sodium, potassium and cesium, a compound containing at least one of sodium and potassium or a compound containing sodium. The alkali source may, for example, be one that contains one or more of the mentioned alkali metal elements and which is at least one selected from the group of hydroxides, fluorides, bromides, iodides, sulfuric acid salts, nitric acid salts and carbonic acid salts or at least one selected from the group of hydroxides, bromides and iodides or is a hydroxide (hereinafter, an alkali source containing sodium may also be referred to as a "sodium source", and alkali source containing potassium as a "potassium source", for instance). It is particularly preferable that the source material composition contain a sodium source and a potassium source. In instances where a starting material, such as an alumina source, contains an alkali metal element, the starting material can also be regarded as an alkali source.

The water may be purified water and/or ion-exchanged water. In addition, other water present in a starting material, such as water of constitution, water of hydration and a solvent, can also be regarded as the water in the source material composition.

A preferred composition of the source material composition may be the following molar composition, for example. In the following composition, SDA denotes an organic structure-directing agent, M denotes an alkali metal element and OH denotes a hydroxide ion. When the SDA is $TMAda^+$, an $SDA/SiO_2$ ratio can be a "$TMAda^+/SiO_2$ ratio", and when the SDA is $CDMEA^+$, the $SDA/SiO_2$ ratio can be a "$CDMEA^+/SiO_2$ ratio", for instance. When M is sodium, a $M/SiO_2$ ratio can be a "$Na/SiO_2$ ratio", and when M is sodium and potassium, the $M/SiO_2$ ratio can be a "$(Na+K)/SiO_2$ ratio", for instance.

$SiO_2/Al_2O_3$ ratio: 10 or greater or 20 or greater and 100 or less, 90 or less, 70 or less, 50 or less or 40 or less $SDA/SiO_2$ ratio: 0.01 or greater or 0.05 or greater and 0.50 or less, 0.40 or less or 0.30 or less $M/SiO_2$ ratio: 0.05 or greater, 0.1 or greater or 0.15 or greater and 1.5 or less, 1.0 or less or 0.4 or less $OH/SiO_2$ ratio: 0.1 or greater or 0.3 or greater and 1.0 or less or 0.6 or less $H_2O/SiO_2$ ratio: 3 or greater, 5 or greater or 8 or greater and 200 or less, 50 or less or 30 or less In the source material composition, a molar ratio [mol/mol] of the moles of aluminum present in one or more amorphous aluminum compounds calculated on an $Al_2O_3$ basis to the moles of aluminum in the source material composition calculated on an $Al_2O_3$ basis is preferably greater than 0, 0.05 or greater or 0.1 or greater and 0.45 or less, 0.30 or less or 0.22 or less (hereinafter, the molar ratio is also referred to as an "amorphous Al ratio"). In these cases, a CHA-type zeolite in which a paired Al ratio, which will be described later, is high can be readily prepared.

The source material composition may be formed with any method that enables the starting materials, such as an alumina source, to become homogeneous. Preferably, the source material mixture may be one prepared by mixing an alumina source, an alkali source, an organic structure-directing agent source and water together and subsequently mixing a silica-alumina source therewith.

The source material composition may include, as necessary, a seed crystal for promoting crystallization, provided that an amount of the seed crystal is sufficiently low with respect to an amount of the silica-alumina source. The seed crystal is crystalline aluminosilicate, which functions to promote the crystallization of the source material composition, and the seed crystal may be a zeolite other than FAU-type zeolites or may be a CHA-type zeolite. The seed crystal may be mixed with the source material composition in a manner such that a total mass (hereinafter also referred to as a "seed crystal content") of the masses of silicon and aluminum in the seed crystal, which are respectively calculated on a $SiO_2$ basis and an $Al_2O_3$ basis, relative to a total mass of the masses of silicon and aluminum in the source material composition (excluding the seed crystal), which are respectively calculated on a $SiO_2$ basis and an $Al_2O_3$ basis, becomes 0.1 mass % or greater, 1.0 mass % or greater or 1.5 mass % or greater and 30.0 mass % or less, 10.0 mass % or less or 5.0 mass % or less.

It is preferable that the source material composition be substantially free of fluorine (F) and phosphorus (P). A fluorine content of the source material composition may be 0 ppm or greater and 100 ppm or less, and such a content is preferable when a measurement limit for the measured value that can be obtained with a typical composition analysis method is taken into account. More preferably, the fluorine content is 0 ppm or greater and 50 ppm or less.

In the crystallization step, the source material composition can be crystallized by performing a hydrothermal treatment thereon. The conditions for the hydrothermal treatment include the following conditions.

Hydrothermal treatment temperature: 80° C. or greater, 100° C. or greater or 120° C. or greater and 200° C. or less, 180° C. or less or 160° C. or less Hydrothermal treatment time: 1 hour or more, 10 hours or more or 1 day or more and 10 days or less or 6 days or less Hydrothermal treatment pressure: autogenous pressure Hydrothermal treatment state: at least one of a state of being stirred and a static state, with a state of being stirred being preferable The production method of the present embodiment may include, as necessary, at least one step that is performed after the crystallization step, and the at least one step (hereinafter also referred to as a "post-treatment step") may be selected from the group of a washing step, a drying step, an ion exchange step and a metal incorporation step.

In the washing step, the CHA-type zeolite is washed. Collection and washing may be carried out with any method; for instance, solid-liquid separation may be performed after the crystallization step, and the resulting solid phase, which is a small-pore zeolite, may be washed with purified water.

In the drying step, water is removed from the CHA-type zeolite. The drying conditions are not limited; for instance, the small-pore zeolite may be treated in air at a temperature of 50° C. or greater and 150° C. or less for 2 hours or more.

In the ion exchange step, the CHA-type zeolite is treated to have a desired cation type. In instances where the cation type is to be an ammonium type, one possible way is to mix the CHA-type zeolite with an aqueous solution of ammonium chloride. In instances where the cation type is to be a proton type, one possible way is to heat-treat the CHA-type zeolite of an ammonium type.

In the metal incorporation step, a desired active metal element is incorporated into the CHA-type zeolite. Preferably, a desired transition metal element is made to be supported on the CHA-type zeolite. Accordingly, a metal-incorporated CHA-type zeolite (or a metal-supported CHA-type zeolite) can be prepared. The incorporation of a metal can be accomplished with any method in which the CHA-type zeolite and a transition metal source are contacted with each other. For example, the method may be at least one selected from the group of ion exchange, incipient wetness impregnation, evaporation to dryness, precipitation-deposition and physical mixing, and preferably, the method is incipient wetness impregnation.

The transition metal source is at least one of a salt and a compound that each contain a transition metal element. Specifically, the transition metal source may be one that contains a transition metal element and which is at least one selected from the group of nitric acid salts, sulfuric acid salts, acetic acid salts, chlorides, complex salts, oxides and complex oxides or at least one selected from the group of nitric acid salts, sulfuric acid salts and chlorides.

The transition metal element present in the transition metal source is at least one selected from the group of group 8 elements, group 9 elements, group 10 elements and group 11 elements in the periodic table. Preferably, the transition metal element is at least one selected from the group of platinum (Pt), palladium (Pd), rhodium (Rh), iron (Fe), copper (Cu), cobalt (Co), manganese (Mn) and indium (In) or at least one of iron and copper or is copper.

The production method of the present embodiment may include, as necessary, a step of heat-treating the metal-incorporated CHA-type zeolite. The heat treatment removes impurities. Methods for the heat treatment are not limited, and the treatment may be performed in at least one of an oxidizing atmosphere and a reducing atmosphere at a temperature of 100° C. or greater and 600° C. or less. Preferably, the treatment is performed in air at a temperature of 400° C. or greater and 600° C. or less.

Now, the CHA-type zeolite of the present embodiment will be described.

The CHA-type zeolite of the present embodiment is a CHA-type zeolite having a paired aluminum ratio of 25% or greater, that is, a CHA-type zeolite in which a molar ratio (hereinafter also referred to as a "paired Al ratio") of aluminum belonging to a paired aluminum structure to the total aluminum present in the CHA-type zeolite is 25% or greater.

The paired Al ratio is 25% or greater, 30% or greater or 35% or greater and 100% or less, 80% or less, 60% or less, 50% or less or 45% or less. When the paired Al ratio is such a ratio, coalescence and sintering of a transition metal element tends to be inhibited in instances in which the transition metal element is incorporated (supported) in the CHA-type zeolite.

In the present embodiment, the paired Al ratio can be determined by determining an amount of cobalt that is introduced by ion exchange into the ion exchange sites of the divalent ion having the paired aluminum structure. Specifically, the paired Al ratio can be determined as follows. A CHA-type zeolite in which a ratio of an alkali metal element and an alkaline earth metal element to aluminum (hereinafter also referred to as a "M/Al ratio") is 0.01 or less is immersed in an aqueous solution of cobalt nitrate, subsequently, a content of cobalt (Co) in the CHA-type zeolite is measured and the following equation is used.

$$\text{Paired Al ratio}[\%]=(M_{Co}[\text{mol}]/M_{Al}[\text{mol}])\times 2\times 100$$

In the equation, $M_{Co}$[mol] is a cobalt content as measured by ICP measurement, and MA [mol] is an aluminum content as measured by ICP measurement.

Furthermore, the conditions for the immersion in an aqueous solution of cobalt nitrate include the following conditions.

Immersion temperature: 10° C. or greater and 40° C. or less

Immersion time: 1 hour or more and 40 hours or less

Cobalt nitrate concentration: 0.001 mol/L or more and 2.0 mol/L or less

Solid/liquid ratio (mass ratio): (CHA-type zeolite/aqueous solution of cobalt nitrate)≤0.5

The CHA-type zeolite having a M/Al ratio of 0.01 or less may be a CHA-type zeolite having a cation type that is a proton type or an ammonium type.

Note that even in instances where the same treatment is performed on a CHA-type zeolite having a M/Al ratio of greater than 0.01, such as CHA-type zeolites having a cation type that is a sodium type, a potassium type, a calcium type or the like, the paired Al ratio can be determined nominally. However, such a nominal paired Al ratio determined for CHA-type zeolites having a M/Al ratio of greater than 0.01 is a ratio involving not only the cobalt ($Co^{2+}$) supported on the ion exchange sites of the divalent ion having the paired aluminum structure but also other cobalt, such as that in a cobalt complex. As such, the value of the nominal paired Al ratio is not a value that reflects the content of the paired aluminum structure in the CHA-type zeolite, that is, the value is greater than the paired Al ratio of the present embodiment (i.e., the actual proportion of the paired aluminum structure). Since the value of the nominal paired Al ratio determined for a CHA-type zeolite having a M/Al ratio of greater than 0.01 (hereinafter also referred to as a "nominal paired Al ratio") varies from the value of the paired Al ratio of the present embodiment, comparisons cannot be made between the paired Al ratio of the present embodiment and the nominal paired Al ratio.

The CHA-type zeolite of the present embodiment may have a $SiO_2/Al_2O_3$ ratio of 10 or greater, 15 or greater or 18 or greater and 70 or less, 40 or less or 30 or less. Particularly preferably, the $SiO_2/Al_2O_3$ ratio may be 20 or greater, 25 or greater or 28 or greater and 60 or less, 50 or less or 45 or less.

It is preferable that the CHA-type zeolite of the present embodiment have a BET specific surface area that is 200 $m^2/g$ or greater, 500 $m^2/g$ or greater or 600 $m^2/g$ or greater and 1000 $m^2/g$ or less, 800 $m^2/g$ or less or 750 $m^2/g$ or less.

The BET specific surface area can be determined with a BET single-point method using a nitrogen adsorption method in accordance with JIS Z 8830: 2013. The measurement of the nitrogen adsorption can be performed on a sample after the sample is pre-treated. Conditions for the pre-treatment and conditions for the nitrogen adsorption are shown below.

Measurement method: constant volume method
Measurement temperature: 77 K (−196° C.)
Pre-treatment: vacuum drying at 150° C. for 1 hour and vacuum drying at 350° C. for 2 hours The nitrogen adsorption can be measured with a typical nitrogen adsorption instrument (e.g., Belsorp-mini II, manufactured by MicrotracBEL).

The CHA-type zeolite of the present embodiment may have a pore volume (hereinafter also referred to as a "micropore volume") of 0.20 mL/g or greater, 0.25 mL/g or greater or 0.30 mL/g or greater and 0.70 mL/g or less, 0.50 mL/g or less or 0.35 mL/g or less.

The micropore volume can be determined by analyzing, with a t-plot method, a nitrogen adsorption isotherm obtained with a method similar to that used for the measurement of the BET specific surface area. The analysis with the t-plot method may be carried out by performing the analysis under the following conditions with analysis software included with a nitrogen adsorption instrument (an example of the analysis software is BELMaster, manufactured by MicrotracBEL).

Adsorbate cross-sectional area: 0.162 $nm^2$
Saturated water vapor: 103.72 kPa
First straight line: a straight line connecting a point at t=0 nm to a point at t=0.26±0.01 nm or a straight line connecting the point at t=0 nm to a point at t=0.27±0.03 nm, with the straight line connecting the point at t=0 nm to the point at t=0.27±0.03 nm being preferable Second straight line: a straight line connecting a point at t=0.60±0.15 nm to a point at t=0.90±0.10 nm or a straight line connecting a point at t=0.35±0.01 nm to a point at t=0.66±0.01 nm, the straight lines each being a tangent line passing through an inflection point of a sigmoidal t-plot curve, with the straight line connecting the point at t=0.60±0.15 nm to the point at t=0.90±0.10 nm and being a tangent line passing through an inflection point of a sigmoidal t-plot curve being preferable In the present embodiment, the CHA-type zeolite may have an average primary particle size of 0.7 μm or less or, preferably, of 0.6 μm or less. Furthermore, an average crystal size may be 0.1 μm or greater, 0.2 μm or greater or 0.3 μm or greater. The particle size of the primary particles is a particle size of primary particles that are identified by performing scanning electron microscope (hereinafter also referred to as an "SEM") observation and using the obtained SEM observation image. The average primary particle size is an average of the particle sizes of the primary particles. A method for measuring the average primary particle size may be a method in which 80 to 150 primary particles in the image are extracted, an average of a longest axis length and a shortest axis length of each of the primary particles is measured and designated as the crystal size of the primary particle and an average of the crystal sizes is designated as the average primary particle size. The number of SEM observation images for the extraction of the primary particles that are subjected to the measurement of the primary particle size may be one or more.

In the present embodiment, the primary particles of the CHA-type zeolite are particles that are observed as discrete particles by SEM observation at a magnification of 10,000 to 20,000 times.

It is preferable that the CHA-type zeolite of the present embodiment contain a transition metal element. The transition metal element is at least one element selected from the group of group 8 elements, group 9 elements, group 10 elements and group 11 elements in the periodic table, at least one selected from the group of platinum (Pt), palladium (Pd), rhodium (Rh), iron (Fe), copper (Cu), cobalt (Co), manganese (Mn) and indium (In) or at least one of iron and copper, or the transition metal element is copper.

In the CHA-type zeolite of the present embodiment, a content of the transition metal element may be 1.0 mass % or greater, 1.5 mass % or greater or 2.0 mass % or greater and 5.0 mass % or less, 4.5 mass % or less or 4.0 mass % or less. Such a content is sufficient.

EXAMPLES

The present embodiment will now be described with reference to examples. However, the present embodiment is not limited to the examples.

(Crystal Structure)

XRD measurements were performed on samples with a typical powder X-ray diffractometer (instrument name: Ultima IV Protectus, manufactured by Rigaku Corporation). The measurement conditions were as follows.

Acceleration current and voltage: 40 mA and 40 kV
Radiation source: CuKα radiation (λ=1.5405 Å)
Measurement mode: continuous scanning
Scanning condition: 40°/minute
Measurement range: 2θ=3° to 43°
Vertical divergence limiting slit: 10 mm
Divergence/entrance slit: 1°
Receiving slit: open
Detector: D/teX Ultra
Ni filter used The obtained XRD patterns were compared against reference patterns, and the crystal structure of the samples was identified.

(Composition Analysis)

Sample solutions were prepared by dissolving the samples in an aqueous solution of a mixture of hydrofluoric acid and nitric acid. Measurements were performed on the sample solutions by inductively coupled plasma emission spectroscopy (ICP-AES) with a typical ICP instrument (instrument name: Optima 5300 DV, manufactured by PerkinElmer). Accordingly, each of the compositions of the samples was determined.

(BET Specific Surface Area and Micropore Volume)

The amount of nitrogen gas adsorption by the samples was measured with a typical nitrogen adsorption instrument (instrument name: Belsorp-mini II, manufactured by MicrotracBEL). The BET method was applied to the results of the nitrogen gas adsorption to determine the BET specific surface area of the samples. Furthermore, the t-plot method was applied to the results of the nitrogen gas adsorption to determine the micropore volume. The t-plot method was carried out by using analysis software (product name: BEL-Master, manufactured by MicrotracBEL) included with the nitrogen adsorption instrument. For the nitrogen gas adsorption, a typical constant volume method was used. The measurement conditions were as follows.

Measurement temperature: −196° C.

Pre-treatment: vacuum drying at 350° C. for 2 hours (Paired Al Ratio)

The samples were immersed in an aqueous solution of cobalt nitrate under the following conditions.

Immersion temperature: room temperature

Immersion time: 20 hours

Cobalt nitrate concentration: 0.25 mol/L

Solid/liquid ratio (mass ratio): (sample/aqueous solution of cobalt nitrate)≤0.5

After the immersion, the samples were collected and washed with purified water and subsequently dried in air at 110° C. for 1 hour. ICP measurements were performed on the dried samples, and the paired Al ratio was measured according to the equation shown above.

Prior to the immersion in the aqueous solution of cobalt nitrate, a pre-treatment was performed with the following method so that the samples could have a cation type that was an ammonium type or a proton type (in either case, Na/Al ratio≤0.01). Specifically, in the case of the ammonium type, the sample was ion-exchanged in a 20% aqueous solution of ammonium chloride. Accordingly, the cation type was made to be an ammonium type (Na/Al ratio≤0.01). On the other hand, in the case of the proton type, after the sample was made to be of an ammonium type, the sample was dried in air at 110° C. overnight and subsequently heat-treated in air at 500° C. Accordingly, the cation type was made to be a proton type (Na/Al ratio≤0.01).

(Residual Intensity)

Before and after a hydrothermal durability treatment, XRD patterns of the samples were measured with a method similar to that described in "(Crystal structure)". An integrated intensity of an XRD peak having a peak top at 2θ=21.0±0.5° (hereinafter also referred to as a "main peak") in each of the XRD patterns was determined with analysis software (trade name: PDXL 2, manufactured by Rigaku Corporation) included with the XRD diffractometer. From the obtained integrated intensity, a residual intensity was determined according to the following equation.

Residual intensity(%)=(integrated intensity of main peak of CHA-type zeolite after durability treatment/integrated intensity of main peak of CHA-type zeolite before durability treatment)×100

Example 1

A source material composition having the following composition was prepared by mixing together an aqueous TMAdaOH solution, purified water, sodium hydroxide, fumed silica, a dried aluminum hydroxide gel (amorphous aluminum compound) and a FAU-type zeolite (zeolite Y, cation type: Na type, $SiO_2/Al_2O_3$ ratio=5.7, BET specific surface area: 790 $m^2/g$). The mixing was carried out by mixing the dried aluminum hydroxide gel, the sodium hydroxide, the aqueous TMAdaOH solution and the purified water together, subsequently mixing the FAU-type zeolite therewith and subsequently adding and mixing the fumed silica therewith.

$SiO_2/Al_2O_3$ ratio=37.6

TMAda/$SiO_2$ ratio=0.195

OH/$SiO_2$ ratio=0.436

Na/$SiO_2$ ratio=0.241

$H_2O/SiO_2$ ratio=9.70

The amorphous Al ratio of the source material composition was 0.18. A CHA-type zeolite was added and mixed with the prepared source material composition such that a content of the seed crystal became 2.0 mass %, and subsequently, the resultant was loaded into a sealable container. The sealed container was then rotated at 40 rpm to place the source material composition in a state of being stirred, and accordingly, a hydrothermal treatment was carried out at 150° C. for 5 days. The crystallized product resulting from the hydrothermal treatment was subjected to solid-liquid separation, and the resultant was washed with purified water and subsequently heat-treated in air at 550° C. Accordingly, a CHA-type zeolite of the present example was prepared.

The CHA-type zeolite was a single phase of a CHA-type zeolite and had a paired Al ratio of 31.6%, a $SiO_2/Al_2O_3$ ratio of 26.0, a BET specific surface area of 737 $m^2/g$, a micropore volume of 0.31 mL/g and an average crystal size of 0.32 μm.

Example 2

A CHA-type zeolite of the present example was prepared in a manner similar to that of Example 1, except that a source material composition having the following composition was used.

$SiO_2/Al_2O_3$ ratio=33.3

TMAda/$SiO_2$ ratio=0.188

OH/$SiO_2$ ratio=0.438

Na/$SiO_2$ ratio=0.250

$H_2O/SiO_2$ ratio=9.30

The amorphous Al ratio of the source material composition was 0.20. The CHA-type zeolite of the present example was a single phase of a CHA-type zeolite and had a paired Al ratio of 39.9%, a $SiO_2/Al_2O_3$ ratio of 25.1, a BET specific surface area of 679 $m^2/g$, a micropore volume of 0.29 mL/g and an average crystal size of 0.38 μm.

Example 3

A CHA-type zeolite of the present example was prepared in a manner similar to that of Example 1, except that a source material composition having the following composition was used.

$SiO_2/Al_2O_3$ ratio=40.0

TMAda/$SiO_2$ ratio=0.200

OH/$SiO_2$ ratio=0.400

Na/$SiO_2$ ratio=0.200

$H_2O/SiO_2$ ratio=10.0

The amorphous Al ratio of the source material composition was 0.20. The CHA-type zeolite of the present example was a single phase of a CHA-type zeolite and had a paired Al ratio of 35.1%, a $SiO_2/Al_2O_3$ ratio of 31.4, a BET specific surface area of 705 $m^2/g$, a micropore volume of 0.34 mL/g and an average crystal size of 0.57 μm.

Example 4

A CHA-type zeolite of the present example was prepared in a manner similar to that of Example 1, except that a source material composition having the following composition was used.

$SiO_2/Al_2O_3$ ratio=80.0

TMAda/$SiO_2$ ratio=0.200

OH/$SiO_2$ ratio=0.400

Na/$SiO_2$ ratio=0.200

$H_2O/SiO_2$ ratio=10.0

The amorphous Al ratio of the source material composition was 0.40. The CHA-type zeolite of the present example was a single phase of a CHA-type zeolite and had a paired Al ratio of 48.4%, a $SiO_2/Al_2O_3$ ratio of 45.4, a BET specific surface area of 761 $m^2/g$ and a micropore volume of 0.32 mL/g.

Example 5

A CHA-type zeolite of the present example was prepared in a manner similar to that of Example 1, except that a source material composition having the following composition was used.

$SiO_2/Al_2O_3$ ratio=28.0

TMAda/$SiO_2$ ratio=0.188

OH/$SiO_2$ ratio=0.538

Na/$SiO_2$ ratio=0.350

$H_2O/SiO_2$ ratio=9.3

The amorphous Al ratio of the source material composition was 0.20. The CHA-type zeolite of the present example was a single phase of a CHA-type zeolite and had a paired Al ratio of 37.9%, a $SiO_2/Al_2O_3$ ratio of 17.5, a BET specific surface area of 761 $m^2/g$, a micropore volume of 0.32 mL/g and an average crystal size of 0.25 μm.

Example 6

A CHA-type zeolite of the present example was prepared in a manner similar to that of Example 1, except that a source material composition having the following composition was used.

$SiO_2/Al_2O_3$ ratio=33.0

TMAda/$SiO_2$ ratio=0.188

OH/$SiO_2$ ratio=0.508

Na/$SiO_2$ ratio=0.320

$H_2O/SiO_2$ ratio=9.3

The amorphous Al ratio of the source material composition was 0.20. The CHA-type zeolite of the present example was a single phase of a CHA-type zeolite and had a paired Al ratio of 46.7%, a $SiO_2/Al_2O_3$ ratio of 20.4, a BET specific surface area of 706 $m^2/g$, a micropore volume of 0.30 mL/g and an average crystal size of 0.26 μm.

Comparative Example 1

A CHA-type zeolite of the present comparative example was prepared in a manner similar to that of Example 1, except that no aluminum hydroxide (dried aluminum hydroxide gel) was used, and a source material composition having the following composition was used.

$SiO_2/Al_2O_3$ ratio=33.3

TMAda/$SiO_2$ ratio=0.188

OH/$SiO_2$ ratio=0.438

Na/$SiO_2$ ratio=0.250

$H_2O/SiO_2$ ratio=9.30

The amorphous Al ratio of the source material composition was 0. The CHA-type zeolite of the present comparative example was a single phase of a CHA-type zeolite and had a paired Al ratio of 22.1% and a $SiO_2/Al_2O_3$ ratio of 22.9.

Comparative Example 2

A CHA-type zeolite was prepared with a method in accordance with that for SSZ-13 (15, 1.00) described in Table 2 of Non Patent Literature 2. Specifically, a source material composition having the following composition was prepared by mixing together an aqueous TMAdaOH solution, purified water, sodium hydroxide, colloidal silica and aluminum hydroxide (crystalline aluminum hydroxide).

$SiO_2/Al_2O_3$ ratio=30.63

TMAda/$SiO_2$ ratio=0.25

OH/$SiO_2$ ratio=0.50

Na/$SiO_2$ ratio=0.25

$H_2O/SiO_2$ ratio=44.0

The amorphous Al ratio of the source material composition was 0. The prepared source material composition was loaded into a sealable container. The sealed container was then rotated at 40 rpm to place the source material composition in a state of being stirred, and accordingly, a hydrothermal treatment was carried out at 160° C. for 6 days. The crystallized product resulting from the hydrothermal treatment was subjected to solid-liquid separation, and the resultant was washed with purified water and subsequently heat-treated in air at 550° C. Accordingly, a CHA-type zeolite of the present comparative example was prepared.

The CHA-type zeolite of the present comparative example was a single phase of a CHA-type zeolite and had a paired Al ratio of 1.0% and a $SiO_2/Al_2O_3$ ratio of 22.8.

According to Non Patent Literature 2, the paired Al ratio determined from the amount of exchanged cobalt was 16% in an instance in which the cation type was a sodium type. In contrast, in the instance in which the cation type was a proton type, the paired Al ratio determined from the amount of exchanged cobalt was 1.0%, which confirmed that the paired Al ratio greatly varies depending on the cation type of the CHA-type zeolite that is measured. Accordingly, it was confirmed that the paired Al ratio of Non Patent Literature 2 was a nominal paired Al ratio.

Comparative Example 3

A CHA-type zeolite of the present comparative example was prepared in a manner similar to that of Example 1, except that aluminum hydroxide (crystalline aluminum hydroxide) was used instead of a dried aluminum hydroxide gel, and a source material composition having the following composition was used.

$SiO_2/Al_2O_3$ ratio=32.8

TMAda/$SiO_2$ ratio=0.195

OH/$SiO_2$ ratio=0.428

Na/$SiO_2$ ratio=0.233

$H_2O/SiO_2$ ratio=9.70

The amorphous Al ratio of the source material composition was 0. A molar ratio of aluminum hydroxide ($Al(OH)_3$) to silica was 0.012. The CHA-type zeolite of the present comparative example was a single phase of a CHA-type zeolite and had a paired Al ratio of 18.6% and a $SiO_2/Al_2O_3$ ratio of 26.6.

The results are shown in the table below.

TABLE 1

| | $SiO_2/Al_2O_3$ ratio | Paired Al ratio |
|---|---|---|
| Example 1 | 26.0 | 31.6% |
| Example 2 | 25.1 | 39.9% |
| Example 3 | 31.4 | 35.1% |
| Example 4 | 45.4 | 48.4% |
| Example 5 | 17.5 | 37.9% |
| Example 6 | 20.4 | 46.7% |
| Comparative Example 1 | 22.9 | 22.1% |
| Comparative Example 2 | 22.8 | 1.0% |
| Comparative Example 3 | 26.6 | 18.6% |

The CHA-type zeolites prepared in Comparative Examples 1 and 2 are both a CHA-type zeolite that was prepared by crystallizing a source material composition containing no silica-alumina source or containing no alumina source, and, therefore, the CHA-type zeolites both contained a larger amount of aluminum (Al) (i.e., had a higher $SiO_2/Al_2O_3$ ratio) than those of Examples 1 to 4. Nevertheless, the paired Al ratios of Comparative Examples 1 and 2 were lower than those of Examples 1 to 4, as could be confirmed. Furthermore, there was no direct correlation between the value of the $SiO_2/Al_2O_3$ ratio and the value of the paired Al ratio, as could be confirmed by a comparison between Examples 2 to 4 or a comparison between Comparative Examples 1 and 2.

Measurement Example

The CHA-type zeolites prepared in Example 1, Example 3, Comparative Example 1 and Comparative Example 3 were ion-exchanged in a 20% aqueous solution of ammonium chloride. Subsequently, the resultants were dried in air at 110° C. overnight and subsequently heat-treated in air at 500° C. In this manner, the cation types were made to be proton types (Na/Al ratio≤0.01). Next, an aqueous solution of copper nitrate was added dropwise to each of the resultants, which was subsequently mixed in a mortar for 10 minutes. After mixing, the mixture was dried in air at 110° C. overnight and subsequently heat-treated in air at 550° C. for 1 hour. In this manner, a metal-incorporated CHA-type zeolite (copper-supported CHA-type zeolite) containing 3 mass % copper supported thereon was prepared.

(Hydrothermal Durability Treatment)

The copper-supported CHA-type zeolite was formed and ground into aggregate particles having an aggregate size of 12 to 20 mesh. 3 mL of the aggregate particles was loaded into a normal-pressure fixed bed flow reactor (hereinafter also referred to simply as a "reactor") and subsequently subjected to a hydrothermal durability treatment under the following conditions.

Treatment atmosphere: an atmosphere through which air with a water content of 10 vol % was passed Space velocity: 9,000 $h^{-1}$ Treatment temperature: 900° C.

Treatment time: 2 hours

XRD patterns of Example 1 and Comparative Example 1, which were obtained after the hydrothermal durability treatment, are shown in FIG. 1. The residual intensities of Example 1, Example 3, Comparative Example 1 and Comparative Example 3, which were obtained after the hydrothermal durability treatment, are shown in the table below.

TABLE 2

| | $SiO_2/Al_2O_3$ ratio | Paired Al ratio | Residual intensity (%) |
|---|---|---|---|
| Example 1 | 26.0 | 31.6% | 36.8 |
| Example 3 | 31.4 | 35.1% | 72.6 |
| Comparative Example 1 | 22.9 | 22.1% | 0 |
| Comparative Example 3 | 26.6 | 18.6% | 0 |

FIG. 1 and the table above indicate that the CHA-type zeolites of the Examples had a higher crystallinity and a higher residual intensity than the CHA-type zeolites of the Comparative Examples. In particular, it was confirmed that in Comparative Example 3, in which the paired Al ratio was low, the hydrothermal durability treatment resulted in collapse of the crystal, despite the fact that the $SiO_2/Al_2O_3$ ratio of Comparative Example 3 was approximately equal to that of Example 1. This confirms that increasing the paired Al ratio inhibits the collapse of crystals from occurring even after a hydrothermal durability treatment.

INDUSTRIAL APPLICABILITY

The method of the present disclosure for producing a CHA-type zeolite can be provided as a method for producing a CHA-type zeolite that can be used as a zeolite catalyst that is incorporated in an exhaust gas treatment system and as a substrate thereof. CHA-type zeolites produced by the production method of the present disclosure can be used, in particular, as an SCR catalyst that removes, by reduction, nitrogen oxides present in exhaust gases of motor vehicles, such as diesel vehicles, in the presence of a reducing agent, and also can be used as an SCR catalyst integrated with a DPF.

The entire contents of the specification, claims, drawing and abstract of Japanese Patent Application No. 2020-144834, filed on Aug. 28, 2020, are incorporated herein by reference as a disclosure of the specification of the present disclosure.

The invention claimed is:

1. A CHA zeolite having a paired aluminum ratio of 46.7% or greater, and a $SiO_2/Al_2O_3$ ratio of from 15 to 60 .

2. The CHA zeolite according to claim 1, wherein the CHA zeolite has a micropore volume of 0.2 mL/g or greater.

3. The CHA zeolite according to claim 1, wherein the CHA zeolite has an average crystal size of 0.7 μm or less.

4. The CHA zeolite according to claim 1, wherein the CHA zeolite has a BET specific surface area of 200 $m^2/g$ or greater and 1000 $m^2/g$ or less.

5. A method for producing a CHA zeolite comprising crystallizing a composition that contains an alumina source, a silica-alumina source, an alkali source, an organic structure-directing agent source and water to obtain a CHA zeolite having a paired aluminum ratio of 46.7% or greater, and a $SiO_2/Al_2O_3$ ratio of from 15 to 60.

6. The method for producing CHA zeolite according to claim 5, wherein the composition is prepared by mixing the alumina source, the alkali source, the organic structure-directing agent source and the water together and subsequently mixing the silica-alumina source therewith.

7. The method according to claim 5, wherein the alumina source is an amorphous aluminum compound.

8. The method according to claim 5, wherein the silica-alumina source is an FAU zeolite.

9. The method according to claim 5, wherein the composition contains a silica source.

10. A nitrogen oxide reduction catalyst comprising the CHA zeolite according to claim 1.

11. A method for reducing a nitrogen oxide comprising using the CHA zeolite according to claim 1.

* * * * *